(12) United States Patent
Martin-Cocher et al.

(10) Patent No.: US 8,812,136 B2
(45) Date of Patent: Aug. 19, 2014

(54) METHOD AND APPARATUS FOR CONTROLLING A LOCATION AUTOMATION SYSTEM VIA A CALENDAR DATABASE

(75) Inventors: Gaelle Christine Martin-Cocher, Toronto (CA); Sherryl Lee Lorraine Scott, Toronto (CA)

(73) Assignee: Blackberry Limited, Waterloo (CA)

( * ) Notice: Subject to any disclaimer, the term of this patent is extended or adjusted under 35 U.S.C. 154(b) by 103 days.

(21) Appl. No.: 12/613,249

(22) Filed: Nov. 5, 2009

(65) Prior Publication Data

US 2011/0106278 A1    May 5, 2011

(51) Int. Cl.
    *G05B 11/10* (2006.01)
    *G06Q 10/00* (2012.01)

(52) U.S. Cl.
    USPC ............ 700/16; 700/17; 705/7.18; 705/7.19; 705/7.2; 705/7.21; 705/7.22; 705/7.23; 705/7.24; 705/7.25; 705/7.26

(58) Field of Classification Search
    USPC .............................. 700/16, 17; 705/7.18–7.26
    See application file for complete search history.

(56) References Cited

U.S. PATENT DOCUMENTS

| | | | | |
|---|---|---|---|---|
| 4,279,012 A * | 7/1981 | Beckedorff et al. | ............ | 700/16 |
| 4,386,649 A * | 6/1983 | Hines et al. | ............ | 165/239 |
| 5,369,570 A * | 11/1994 | Parad | ............ | 705/7.13 |
| 6,016,478 A * | 1/2000 | Zhang et al. | ............ | 705/7.19 |
| 6,073,110 A * | 6/2000 | Rhodes et al. | ............ | 705/7.12 |
| 6,304,881 B1 * | 10/2001 | Halim et al. | ............ | 1/1 |
| 6,466,951 B1 * | 10/2002 | Birkler et al. | ............ | 1/1 |
| 6,473,661 B1 * | 10/2002 | Wollner | ............ | 700/83 |
| 6,665,721 B1 * | 12/2003 | Hind et al. | ............ | 709/227 |
| 6,879,997 B1 * | 4/2005 | Ketola et al. | ............ | 709/208 |
| 6,948,171 B2 * | 9/2005 | Dan et al. | ............ | 718/100 |
| 7,082,402 B2 * | 7/2006 | Conmy et al. | ............ | 705/7.19 |
| 7,124,087 B1 * | 10/2006 | Rodriguez et al. | ............ | 705/5 |
| 7,769,611 B1 * | 8/2010 | Rodriguez et al. | ............ | 705/7.11 |
| 8,024,054 B2 * | 9/2011 | Mairs et al. | ............ | 700/83 |
| 8,073,725 B2 * | 12/2011 | Loring et al. | ............ | 705/7.18 |
| 8,117,056 B2 * | 2/2012 | Berstis et al. | ............ | 705/7.19 |
| 8,250,163 B2 * | 8/2012 | Castaldo et al. | ............ | 709/208 |
| 2002/0035493 A1 * | 3/2002 | Mozayeny et al. | ............ | 705/5 |
| 2002/0078070 A1 * | 6/2002 | Eshelman et al. | ............ | 707/200 |
| 2003/0097273 A1 * | 5/2003 | Carpenter et al. | ............ | 705/1 |

(Continued)

FOREIGN PATENT DOCUMENTS

EP     893774 A2 *   1/1999

OTHER PUBLICATIONS

Chen et al., "Intelligent Agents Meet Sematic Web in a Smart Meeting Room", AAMAS'04, ACM, 2004, 852-859.*

(Continued)

*Primary Examiner* — Kavita Padmanabhan
*Assistant Examiner* — Thomas Stevens
(74) *Attorney, Agent, or Firm* — Perry + Currier Inc.

(57) ABSTRACT

A method and apparatus for controlling a location automation system via computing device having access to a calendar database is provided. Calendar data, from the calendar database, is processed to determine that at least one location automation event controlled by the location automation system is affected by the calendar data. The location automation setting data is updated, based on the calendar data, such that the at least one location automation event occurs according to the calendar data.

26 Claims, 8 Drawing Sheets

(56) References Cited

U.S. PATENT DOCUMENTS

| | | | |
|---|---|---|---|
| 2003/0097358 A1* | 5/2003 | Mendez | 707/3 |
| 2003/0124493 A1* | 7/2003 | Kulack | 434/118 |
| 2003/0231619 A1* | 12/2003 | Akturk | 370/352 |
| 2004/0064585 A1* | 4/2004 | Doss et al. | 709/246 |
| 2004/0073615 A1* | 4/2004 | Darling | 709/206 |
| 2005/0108091 A1 | 5/2005 | Sotak et al. | |
| 2005/0192973 A1* | 9/2005 | Sperling et al. | 707/100 |
| 2006/0129444 A1* | 6/2006 | Baeza et al. | 705/8 |
| 2006/0206522 A1* | 9/2006 | Austin et al. | 707/104.1 |
| 2006/0212330 A1* | 9/2006 | Savilampi | 705/8 |
| 2007/0043687 A1 | 2/2007 | Bodart et al. | |
| 2007/0106543 A1* | 5/2007 | Baughman et al. | 705/7 |
| 2007/0250370 A1* | 10/2007 | Partridge et al. | 705/8 |
| 2007/0299966 A1* | 12/2007 | Crawford et al. | 709/224 |
| 2008/0046471 A1* | 2/2008 | Moore et al. | 707/104.1 |
| 2008/0091726 A1* | 4/2008 | Koretz et al. | 707/104.1 |
| 2008/0271123 A1 | 10/2008 | Ollis et al. | |
| 2008/0277486 A1 | 11/2008 | Seem et al. | |
| 2009/0089342 A1* | 4/2009 | Runstedler et al. | 707/204 |
| 2009/0112986 A1* | 4/2009 | Caceres | 709/204 |
| 2009/0243852 A1 | 10/2009 | Haupt et al. | |
| 2010/0114942 A1* | 5/2010 | Nelken | 707/769 |
| 2010/0127854 A1 | 5/2010 | Helvick et al. | |
| 2011/0010093 A1* | 1/2011 | Partridge et al. | 701/300 |

OTHER PUBLICATIONS

European Patent Application No. 09 175 167.7 Examination Report dated Dec. 9, 2010.

European Patent Application No. 09175167.7 Search Report dated Dec. 29, 2009.

Home Automation: Controlling Your House with Computers—Stepcase Lifehack—downloaded from http://www.lifehack.org/articles/technology/home-automation-controllingyour-house-with-computers.html, 12 pages, May 11, 2009.

CeBotics—HouseBot—downloaded from http://www.cebotics.com/, 1 page, May 11, 2009.

Perceptive Automation Indigo—downloaded from http://www.perceptiveautomation.com/indigo/index.html, 4 pages, May 11, 2009.

HomNet—downloaded from http://www.Ighomnet.co.kr/, 1 page May 11, 2009.

Google Calendar—downloaded from http://www.google.com/intl/en/googlecalendar/about.html, 1 page May 11, 2009.

Xoc Sofrware—downloaded from http://www.xoc.net/smarthome/default.asp, 10 pages May 11, 2009.

HomNet—downloaded from http://www.Ighomnet.com/homnet/intro/homnet.jsp, 2 pagses May 11, 2009.

Time It Right: home automation based on the Jewish Calendar—downloaded from http://www.radwin.org/michael/blog/2006/10/time_it_right_home_automat.html, 2 pages May 11, 2009.

Google Books—downloaded from http://books.google.ca/books?id=QCLga-Ndph4C&pg=PA66&lpg=PA66&dq=home+automation+calendar&source=bl&ots=zVMBfkV2a8=V3McapN9Mt8cOblt-TkwbNMH01E&hl=en&ei=9x4cSpX6EYG-Ms_12JkP&sa=X&oi=book_result&ct=result&resnum=1, 1 page May 11, 2009.

CocoonTech.com—downloaded from http://www.cocoontech.com/forums/index.php?showtopic=13237, 8 pages May 11, 2009.

Open Mobile Alliance, "Converged Personal Network Service Requirements", Draft Version 1.0—Apr. 24, 2009, Open Mobile Alliance Ltd.—downloaded from will be used for home automation purposes. http://member.openmobilealliance.org/ftp/Public_documents/REQ/REQCPNS/Permanent_documents/OMA-RD-CPNS-V1_0-20090427-D.zip, 35 pages.

* cited by examiner

METHOD AND APPARATUS FOR CONTROLLING A LOCATION AUTOMATION SYSTEM VIA A CALENDAR DATABASE

FIELD

The specification relates generally to a location automation system, and specifically to a method and apparatus for controlling a location automation system.

BACKGROUND

Location automation systems, which control locations such as homes, offices and the like, can be remotely controlled, for example, by remote login to location automation system to change location automation setting data, e.g. via a website or special applications on mobile devices which can communicate with the location automation system. However, this process is inefficient and requires what can be an inordinate amount of time on the part of a normal occupant of a location, as well as bandwidth, and the development of the special applications and/or websites. For example, a location automation system can control the temperature of a location (e.g. a home, an office and the like) at 17:30 in the evening, for example a half hour before the location is normally occupied. However, if the normal arrival times of the occupants change (e.g. meetings get scheduled late and/or cancelled, travel plans get delayed etc.) then unless the occupant(s) remember to remotely change the location automation settings, the heat will run either longer than necessary, or the occupant(s) can arrive to a cold home. If the heat runs longer than necessary, heating an unoccupied space, resources at the location are wasted. Furthermore, if there are multiple occupants of the location, their schedules must be manually coordinated, for example via telephone calls to each other, to coordinate the location automation settings.

The drawbacks in the example above also exist in other location automation scenarios such as security, lighting, appliance control (e.g., air conditioners, dishwashers, etc), entertainment (e.g., TV, radio, program recording devices, etc), and the like. Such scenarios can occur at locations such as homes, businesses, offices, factories, and other locations where automation can be used.

BRIEF DESCRIPTIONS OF THE DRAWINGS

Embodiments are described with reference to the following figures, in which.

DETAILED DESCRIPTION OF THE EMBODIMENTS

Figure 1:
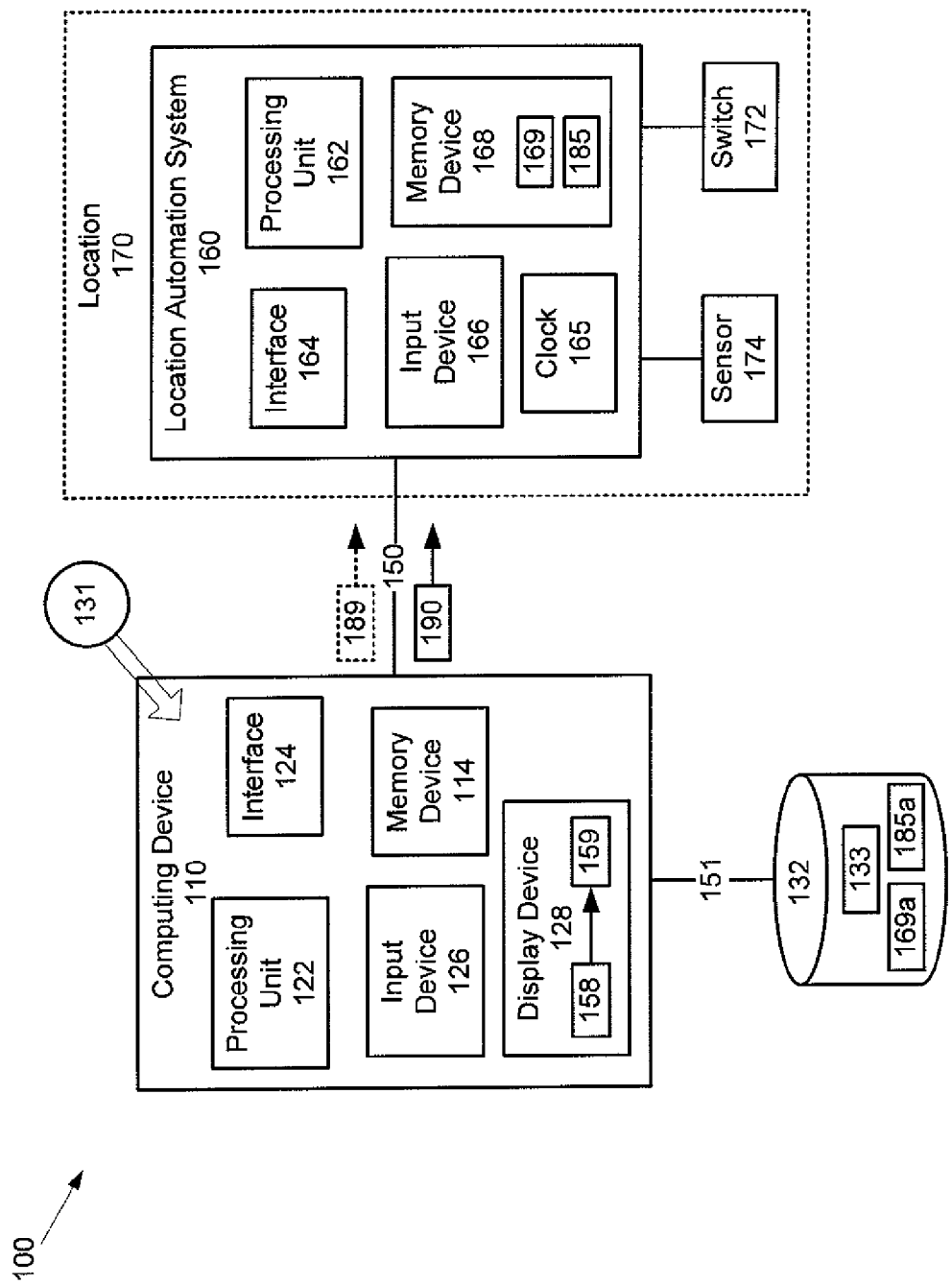
FIG. 1 depicts a block diagram of a system for controlling a location automation system, according to non-limiting embodiments.

A first aspect of the specification provides a method for controlling a location automation system via a computing device having access to a calendar database. The method comprises processing calendar data, from the calendar database, to determine that at least one location automation event controlled by the location automation system is affected by the calendar data. The method further comprises causing location automation setting data, at the location automation system, to be updated, based on the calendar data such that the at least one location automation event occurs according to the calendar data.

Processing the calendar data can comprise: determining if changes have occurred to the calendar data; and determining if the changes affect the at least one location automation event controlled by the location automation system.

Processing the calendar data can occur in response to a change to the calendar data.

Processing the calendar data can comprise comparing at least a subset of the calendar data to at least one of the location automation setting data and location automation rule data to determine if the at least one location automation event controlled by the location automation system, is affected by the calendar data. The location automation rule data can comprise at least one rule for changing a setting in the location automation system.

Causing location automation setting data to be updated can comprise at least one of: synchronizing the calendar database and the location automation system; notifying the location automation system of changes to the location automation system data; receiving a request from the location automation system for the changes to the location automation system data; and processing the location automation setting data to store the changes to the location automation system data.

The method can further comprise synchronizing the calendar database with a plurality of calendar databases such that the calendar data comprises calendar data from the plurality of calendar databases. Causing the location automation setting data location to be updated can be based on calendar data associated with a respective one of the plurality of calendar databases. Causing the location automation setting data location to be updated can be based on a priority of each of the plurality of calendar databases.

The method can further comprise determining proximity of a device to a location controlled by the location automation system and causing the location automation setting data, at the location automation system, to be updated based on the proximity.

A plurality of devices can be associated with the location automation system, such that the location automation setting data can be updated based on at least one respective calendar database. One of the plurality of devices can be designated as a master device having priority over others of the plurality of devices, such that the location automation setting data can be updated first based on at least one of calendar data associated with and proximity of the master device to the location.

The computing device can comprise a shared device associated with a plurality of calendar databases, such that the location automation setting data can be updated based on the plurality of calendar databases.

The calendar data can comprise at least one of a date of a meeting, a start time of a meeting, an end time of a meeting, a subject of a meeting, a location of a meeting, a category of a meeting, a recurrence indication, and invitees to a meeting.

A second aspect of the specification provides a computing device for controlling a location automation system via a calendar database. The computing device comprises a processing unit interconnected with a memory and a communications interface, the processing unit having access to the calendar database location. The processing unit is enabled to process calendar data, from the calendar database, to determine that at least one location automation event controlled by the location automation system, is affected by the calendar data. The processing unit is further enabled to cause the location automation setting data, at the location automation system, to be updated, based on the calendar data such that the at least one location automation event occurs according to the calendar data.

To process the calendar data, the processing unit can be further enabled to: determine if changes have occurred to the calendar data; and determine if the changes affect the at least one location automation event controlled by the location automation system.

The processing unit can be further enabled to process the calendar data in response to a change to the calendar data.

To process the calendar data, the processing unit can be further enabled to compare at least a subset of the calendar data to at least one of the location automation setting data and location automation rule data to determine if the at least one location automation event controlled by the location automation system, is affected by the calendar data.

The location automation rule data can comprise at least one rule for changing a setting in the location automation system.

To cause location automation setting data to be updated, the processing unit can be further enabled to at least one of: synchronize the calendar database and the location automation system; notify the location automation system of changes to the location automation system data; receive a request from the location automation system for the changes to the location automation system data; and process the location automation setting data to store the changes to the location automation system data.

The processing unit can be further enabled to synchronize the calendar database with a plurality of calendar databases such that the calendar data can comprise calendar data from the plurality of calendar databases. The processing unit can be further enabled to cause the location automation setting data, at the location automation system, to be updated based on calendar data associated with a respective one of the plurality of calendar databases. The processing unit can be further enabled to cause the location automation setting data, at the location automation system, to be updated based on a priority of each of the plurality of calendar databases.

The processing unit can be further enabled to determine proximity of a device to a location controlled by the location automation system and cause the location automation setting data, at the location automation system, to be updated based on the proximity.

A plurality of devices can be associated with the location automation system, such that the location automation setting data can be updated based on at least one respective calendar database. One of the plurality of devices can be designated as a master device having priority over others of the plurality of devices, such that the location automation setting data can be updated first based on at least one of calendar data associated with and proximity of the master device to the location.

The computing device can further comprise a shared device associated with a plurality of calendar databases, such that the location automation setting data can be updated based on the plurality of calendar databases.

The calendar data can comprise at least one of a date of a meeting, a start time of a meeting, an end time of a meeting, a subject of a meeting, a location of a meeting, a category of a meeting, a recurrence indication, and invitees to a meeting.

The computing apparatus can be located at one of the location automation system and a location remote from the location automation system.

A third aspect of the specification provides a computer program product, comprising a computer usable medium having a computer readable program code adapted to be executed to implement a method for controlling a location automation system via computing device having access to a calendar database, the method comprising: processing calendar data, from the calendar database, to determine that at least one location automation event controlled by the location automation system, is affected by the calendar data; and causing location automation setting data, at the location automation system, to be updated, based on the calendar data such that the at least one location automation event occurs according to the calendar data.

FIG. 1 depicts a system for controlling a location automation system 160 via a computing device 110 having access to a calendar database 132 storing calendar data 133, according to non-limiting embodiments. Computing device 110 comprises a processing unit 122, a communications interface 124, a memory device 114, an input device 126 and display device 128 all in communication, for example, via a computing bus (not depicted). Location automation system 160 comprises a processing unit 162, a communications interface 164, a clock 165, a memory device 168, and optionally an input device 126 all in communication, for example, via a computing bus (not depicted). In some embodiments, location automation system 160 comprises a home automation system, however in other embodiments, location automation system 160 can comprise an automation system for a business and/or an office. In general, location automation system 160 is enabled to control a location 170, for example a home location such as a house and/or a residence, a cottage location, a vacation residence, an office location, a business location, a factory, or at any other suitable location which can be affected by changes to calendar database 132. Location automation system 160 is enabled to control at least one switch 172 and, optionally, at least one sensor 174, at location 170. Each respective switch 172 and sensor 174 can be associated with an appliance and/or a device, including but not limited to appliances and/or devices associated with HVAC (heating, ventilating, and air conditioning) system(s) (not depicted) at location 170. For example, switch 172 can be enabled to turn on one or more lights. Alternatively, switch 172 can be enabled to turn on a heating or air conditioning system, while sensor 174 can be enabled to measure temperature.

In some embodiments, location automation system 160 can be integrated into location 170 (as depicted), while in other embodiments, location automation system 160 can be remotely located from location 170 and in communication with at least one sensor 174 and at least one switch 172 via any suitable wired or wireless link.

Location automation setting 160 is generally understood to control location 170 via at least one sensor 174 and, optionally, at least one switch 172 using location automation setting data 169 stored in memory device 168. Location automation setting data 169 comprises settings for controlling at least one switch 172, using data from clock 165, and optionally data from at least one sensor 174. In some embodiments location automation setting data 169 can comprise a list of appliances/devices/systems, a list of events associated with each appliance/device/system and values associated with each appliance/device/system. Hence, in general location automation setting data 169 comprises a set of event data that is to occur when controlling location 170. For example, location automation setting data 169 can comprise Table 1:

TABLE 1

Non-limiting example of location automation setting data

| Appliance/Device/System | Event | Setting | Time (24 hr clock) |
|---|---|---|---|
| HVAC System | Set temperature to | 16° C. | 09:00 |
| HVAC System | Set temperature to | 22° C. | 17:30 |
| First Floor Lights | Turn off | OFF | 09:00 |
| First Floor Lights | Turn on | ON | 18:00 |
| Radio | Turn off | OFF | 09:00 |
| Radio | Turn on | ON | 18:00 |

While Table 1 is arranged in rows and columns it is understood that location automation setting data 169 can be in any suitable format and need not comprise rows and columns. In general, each row in Table 1 comprises a different event that is to occur. Furthermore, Table 1 comprises a column for identifying at least one of an "Appliance", a "Device" and a "System", for example, "HVAC System", "First Floor Lights", and "Radio". Table 1 further comprises a column for identifying an "Event" such as "Set temperature to", and the like. Table 1 further comprises a column for identifying a "Setting" such a temperature setting, and/or whether an appliance/device/system is to be turned on or off. Table 1 further comprises a column for identifying a "Time" that the "Event" is to occur. In these and other embodiments, it is assumed that location 170 comprises a home/residence and that the residence is generally unoccupied during business hours. However, in other embodiments, the location 170 can comprise an office, a cottage location, a vacation residence, a business, or a factory. Other examples of appliances, devices, and systems at these locations include door locks, alarms, ovens, manufacturing equipment, computers, and the like.

For example, from Table 1, it is understood that the temperature of location is to be regulated to 16° C. at 09:00 and to 22° C. at 17:30. Furthermore, the first floor lights and a radio are to be turned off at 09:00, and turned on at 18:00. In this example, it is understood that an occupant of location 170 normally leaves location 170 before 09:00, for example to go to work, and normally arrives home around 18:00. Hence, while the occupant is gone from location 170, the temperature is lowered and various appliances/devices etc. are turned off; it is further understood that when the occupant arrives back at location 170, various appliances/devices etc. are turned on and that the temperature of location 170 is regulated to a level 30 minutes before hand to allow time for location 170 to reach the level.

Each of the HVAC system, the first floor lights and the radio can be controlled via at least one switch 172, at least one switch for each. Furthermore, HVAC system can be regulated via at least one sensor 174, for example by measuring the temperature of location 170 and controlling switch 172 based on the temperature.

It is further understood that location automation setting data 169 can further comprise at least one date for which each event and/or a set of events is to occur. Furthermore, it is understood that location automation setting data 169 can comprise a set of events that is to occur on weekdays, weekends, vacations, sick days, holidays, business trips, and the like. In some embodiments, location automation setting data 169 can comprise default event data for each of weekdays, weekends, vacations, sick days, holidays, business trips, and the like. For example, Table 1 can comprise default weekday event data comprising events that are to occur Monday to Friday. Via clock data from clock 165 and/or input data from input device 166, the set of event data in location automation setting data 169 that is to occur on a given day can be determined.

In some embodiments, described further below, security features can be implemented in system 100. For example, location automation system 160 can monitor location 170 and if any events occur, location automation system 160 can notify computing device 110 via link 150. For example, computing device 110 can be notified that a change to location automation setting data 169 has occurred and/or if location automation system 160 has caused switch 172 to be activated (or any other suitable switch) and/or if an unexpected change to location 170 is recorded at sensor 174. For example, with reference to the non-limiting example in Table 1 above, if the first floor lights are scheduled to turn on at 18:00, but instead turn on at an earlier time (e.g. 13:00), then it is possible that an unexpected entry has occurred at location 170 (e.g. a break-in) and computing device 110 can be notified. Alternatively, sensor 174 detects that an unexpected change in temperature has occurred (e.g. due to a fire), then computing device 110 can be notified.

Furthermore, in some embodiments, computing device 110 can be associated with more than one set of calendar data (e.g. each set of calendar data associated with a different user), similar to calendar data 133, which can be stored at calendar database 132 or another calendar database, each set of calendar data associated with an occupant of location 170. In these embodiments, further security features can be implemented. For example, location automation system data 169 can comprise settings that are specific to each occupant of location 170 and computing device 110 can be notified if unexpected changes occur at location 170 according to each person's schedule; if the lights and heat are to be turned at a given time as a child occupant is due home, and instead the lights and heat are turned on at a different time, this can indicate a problem with the child (e.g. home sick from school and/or a break-in just before the child is due home), and computing device 110 can hence be notified by location automation system 160 via link 150.

In yet further embodiments, an occupant of location 170 associated with computing device 110 can be associated with more than one computing device (e.g. computing device 110 and at least another computing device, similar to computing device 110). In a specific non-limiting example, an occupant of location 170 can be associated with a work computing device (e.g. computing device 110) and a personal computing device, for example a mobile computing device, such as a personal digital assistant (PDA), and the like. In these embodiments, further security features can be implemented. For example, the mobile computing device can comprise a global positioning system (GPS) device and hence its position can be tracked. In these embodiments, location automation system 160 can be updated based on the position of the mobile computing device. For example, proximity of the mobile computing device to location 160 can cause updating of location automation setting data 169 on the assumption that the occupant of location 170 associated with the mobile computing device is about to arrive at location 170. However, if this arrival time is at an unexpected time, and hence causes the lights, heat etc. to turn on at an unexpected time, a notification can be transmitted from location automation system 160 to computing device 110; e.g. the mobile computing device can have been stolen and its proximity to location 170 can be indicative that an unexpected entry to location 170 is about to occur (e.g. a break-in). In these embodiments, location automation system 160 is enabled to determine the location of the mobile electronics device, for example by communicating with the mobile electronics device and/or a remote computing device tracking the location of the mobile electronics device.

Computing device 110 is generally in communication with location automation system 160 via a link 150, which can be wired or wireless as desired. Furthermore, computing device 110 generally has access to calendar database 132 and hence calendar data 133. In some embodiments, as depicted, computing device 110 can be in communication with calendar database 132 via a link 151, which can be wired or wireless as desired, however in other embodiments, calendar database or a portion thereof can be stored in memory device 114.

Computing device 110 further comprises an application 131 that can be stored in memory device 114. Application 131, upon being processed by processing unit 122, causes processing unit 122 to cause location automation setting data 169 to be updated based on calendar data 133, such that at least one location automation event occurs according to calendar data 133, as will be described below.

In general, computing device 110 comprises any suitable computing and/or communication device for processing application 131 including but not limited to any suitable one of or combination of servers, a web calendar servers, personal computers, laptops, mobile electronic devices, personal digital assistants (PDAs), smart phones, cell phones and the like. Other suitable types of computing devices are within the scope of present embodiments.

Location automation system 160 comprises any suitable computing and/or communication device for processing location automation setting data 169 and communication with switch 172 and/or sensor 174, including but not limited to any suitable combination of servers, personal computers, laptops and the like. Other suitable types of computing devices are within the scope of present embodiments.

Memory device 114 and memory device 168 can each respectively comprise any suitable memory device, including but not limited to random access memory (RAM), read-only memory (ROM), flash memory, magnetic computer storage devices (e.g. hard disks, floppy disks, and magnetic tape), optical discs, and the like.

Each of processing unit 122 and processing unit 162 comprises any suitable processing unit for processing calendar data 133 and location automation setting data 169, respectively, including but not limited to any central processing unit (CPU) and or any respective suitable combination of CPUs. In addition, processing unit 122 is enabled to process application 131.

Communications interface 124 and communication interface 164 are enabled to communicate with each other via link 150. Accordingly, communications interface 124 and communication interface 164 are enabled to communicate via link 150 according to any suitable wired or wireless protocol which is compatible with link 150, including but not limited to packet based protocols, Internet protocols, analog protocols, PSTN (public switched telephone network) protocols, cell phone protocols (1×, UTMS (Universal Mobile Telecommunications System), CDMA (Code Division Multiple Access), GSM (Global System for Mobile communications) and the like), WiFi protocols, WiMax protocols and/or a combination. Other suitable protocols are within the scope of present embodiments. Furthermore each of communications interface 124 and communication interface 164 can communicate via same or different communication protocols, as desired. It is understood that communication interface 164 can be further enabled to communicate with switch 172 and sensor 174 using any suitable wired or wireless protocol.

Similarly, link 150 can comprise any suitable combination of wired and/or wireless communication networks, including but not limited to packet based networks, the Internet, analog networks, the PSTN, LAN, WAN, cell phone networks, WiFi networks, WiMax networks and/or a combination. Other suitable types of communication networks are within the scope of present embodiments.

Input device 126 and input device 166 are each generally enabled to receive input data, and can comprise any suitable one of or combination of input devices, including but not limited to a keyboard, a keypad, a pointing device, a mouse, a track wheel, a trackball, a touchpad, a touch screen and the like. In particular, input device 126 is enabled to receive data for creating and/or updating calendar data 133, while input device 166 is enabled to receive data for creating and/or updating location automation setting data 169.

Display module 128 comprises circuitry 158 for generating a representation 159 of calendar data 133. Display module 128 can include any suitable display such as a flat panel display (e.g. LCD (liquid crystal display), plasma, OLED (organic light emitting diode), touchscreen display and the like) or a cathode ray tubes (CRT) display. Circuitry 158 can include any suitable combination of circuitry for controlling the flat panel display or CRT; including but not limited to display buffers, transistors, electron beam controllers, LCD cells, LED (light emitting diode) cells, plasmas cells, phosphors, etc. In particular, display module 128 and circuitry 158 can be controlled by processing unit 122 to generate representation 159.

Clock 165 comprises any suitable clock which can communicate date and time to processing unit 162, and specifically any suitable digital clock. In some embodiments, a present date and time can be received via input device 166 to provision the date and time of clock 165. In some embodiments (not depicted), computing device 110 can comprise a clock similar to clock 165.

Calendar database 132 comprises any suitable database, and can reside at any suitable computing device (not depicted) for storing calendar database 132, such as a calendar server, a PIM server, a personal computer and the like. For example, in particular non-limiting embodiments, calendar database 132 can be stored at an enterprise based PIM server. In other non-limiting embodiments, calendar database 132 can be stored at web-based calendar server. In yet other embodiments; calendar database 132 or a portion thereof can be local to computing device 110, for example stored in memory device 114.

Calendar data 133 is generally understood to represent a schedule associated with computing device 110, for example a schedule of a user (not depicted) associated with computing device 110, who is also an occupant of location 170. For example, such a user may live or work at location 170 and maintain a schedule via calendar data 133. Hence, calendar data 133 generally comprises data associated with meetings and the like. Non-limiting embodiments of the meeting data can comprise a date of a meeting, a start time of a meeting, an end time of a meeting, a subject of a meeting, a location of a meeting, a category of a meeting (out of the office, holidays, etc.), a recurrence indication, invitees to a meeting and/or any other data associated with a meeting. Calendar data 133 can be stored in any suitable manner, and in any suitable format. Further, application 131 is generally enabled to process calendar data 133.

When more than one user share a particular computing device 110, different sets of calendar data 133 can each be made accessible on the computing device 110 for the respective user via a device login specific to that user. For example, in the case where a father and son share a mobile phone, the father and son each has login credentials that provide access to the respective set of calendar data 133.

A particular non-limiting example of calendar data 133 comprises Table 2:

TABLE 2

Date: Tuesday Sep. 8, 2009

| Time | Meetings |
|---|---|
| 06:00 | |
| 07:00 | |
| 08:00 | |
| 09:00 | Meet with CEO |
| 10:00 | |
| 11:00 | |
| 12:00 | |
| 13:00 | |
| 14:00 | |
| 15:00 | |
| 16:00 | |
| 17:00 | |
| 18:00 | Dinner Meeting with Client |
| 19:00 | |

While Table 2 is arranged in rows and columns it is understood that calendar data 133 can be in any suitable format and need not comprise rows and columns. However, in the non-limiting example, calendar data 133 comprises a calendar date of the schedule (e.g. Tuesday Sep. 8, 2009), a column indicating the time of day for the calendar date, and a column for indicating the presence of meetings scheduled at a respective time of day on the calendar date. In other embodiments, calendar data 133 can be organized in a different manner as long as the existing meetings are associated with a time of day and a date on which they are scheduled.

From Table 2, it is understood that calendar data 133 comprises two scheduled events: "Meet with CEO" from 09:00 to 10:00, and "Dinner Meeting with Client" from 18:00 until 19:00. In the case where the location 170 is the user's home, it is unlikely that the user will return to location 170 at 18:00, as assumed in Table 1. As such, the heat will be turned on prematurely (at 17:30, per Table 1), as will the first floor lights and radio (see Table 1), wasting energy and resources at location 170.

To address this problem, computing device 110 is enabled to process calendar data 133 to determine if at least one location automation event controlled by location automation system 160 (i.e. as defined in location automation setting data 169), is affected by calendar data 133. To enable such a function, computing device 110 can have access to location automation setting data 169, for example via link 150, and/or a copy 169a of at least a subset of location automation setting data 169, which can be stored at database 132 (as depicted) and/or in memory device 114. Alternatively, to enable such a function, computing device 110 can have access to location automation rule data 185, which can be stored in memory device 168 in location automation system 160, and/or a copy 185a of at least a subset of location automation rule data 185, which can be stored at database 132 (as depicted) and/or in memory device 114. In some embodiments, computing device 110 can have access to one or both of location automation setting data 169 or copy 169a, and location automation rule data 185 or copy 185a. In general location automation rule data 185 can comprise at least one rule for changing a setting in location automation system 160. For example, if an arrival time at location 170 after work changes, then a setting in location automation system 160 is to be changed to reflect the change in arrival time at location 170 after work.

In the case where the computing device 110 has access to multiple sets of calendar data 133 corresponding to different users, the processing unit 122 can be programmed to determine a governing set of calendar data 133. For example, if the father's schedule is as shown in Table 2, but the son's calendar data 133 indicates that the son will be arriving home from soccer practice at the normal time (e.g., 18:00), then the processing unit 122 determines that the son's calendar data 133 governs for the above-described scenario.

In the case where multiple computing devices 110 associated with distinct sets of calendar data 133 are associated with the location 170 (i.e., several device users frequent the same location, such as family members living in the same home), the location automation system 160 can determine which calendar data 133 governs. For example, if a mother and daughter each have their own mobile phones having distinct calendars therein and these devices are linked to the location automation system 160, then when the mother is delayed at another location (e.g., work) and her calendar data 133 is updated accordingly, the location automation system 170 can determine that the daughter's calendar data 133 governs when the daughter's calendar data 133 reflects that the daughter is not delayed in arriving home (location 170).

In some embodiments, location automation rule data 185 can comprise a subset and/or portions of location automation setting data 169; for example, rather than each event in location automation setting data 169, location automation rule data 185 can comprise a normal time that an occupant of location 170 leaves location 170 on a weekday (e.g. leaving home at 08:30) and a normal time that occupant of location 170 arrives at location on a weekday (e.g. arriving home at 18:00). In other words, location automation rule data 185 can comprise times associated with event data stored in location automation setting data 169. The same applies to other kinds of locations, such as those mentioned above, in addition to residences.

In yet further embodiments, location automation rule data 185 can comprise specific rules for when location automation setting data 169 is to be updated based on calendar data 133. For example, a rule can state that changes to calendar data 133 which occur during a working day (e.g. 09:00-17:00) are to have no affect on location automation system 160 when the location is a home. However, another rule can state that a meeting end time is greater than a time of day and/or and end time of work, then change event settings in the home's location automation setting data 169 associated with temperature, and the like (e.g. If meeting end>time of day (set temp)). Furthermore, location automation rule data 185 can comprise rules about how the location automation setting data 169 is to be changed. In a non-limiting example, if a home temperature is to be changed, a rule for changing temperature can be: Time(set tempt)=MeetingEndTime+1 hour, wherein 1 hour is a time representative of driving time between location 170 and a place of work. Any other suitable rule in location automation rule data 185 are within the scope of present embodiments, and can be based on sick days (e.g. regulate heat to a temperature based on a home location 170 being occupied throughout the day, if a day in calendar data 133 is designated as a sick day); vacation days (e.g. regulate heat to a temperature based on the home location 170 being unoccupied (or occupied in the case of a home vacation and/or when location 170 comprises a vacation residence etc.) throughout the duration of the vacation, if a day in calendar data 133 is designated as a vacation day); changes in travel plans (e.g. regulate heat to a press-set temperature at a time based on an early or late arrival time of a flight); and the like. In the last example, calendar data 133 can be updated to reflect the early or late arrival time of the flight based on either data received via input device 126 and/or access to a network resource (not depicted) from which early or late arrival times of the flight can be retrieved.

In some embodiments, computing device 110 and location automation system 160 can be combined in a single computing device, with resources shared between computing device 110 and location automation system 160. For example, such a single computing device can comprise a single processing unit, communication interface memory, etc. interconnected via a computing bus. Furthermore, calendar data accessible by such a single computing device can be synchronized with calendar data stored at a remote computing device, and location automation system data 169 updated based on calendar data received during the synchronization.

Figure 2:
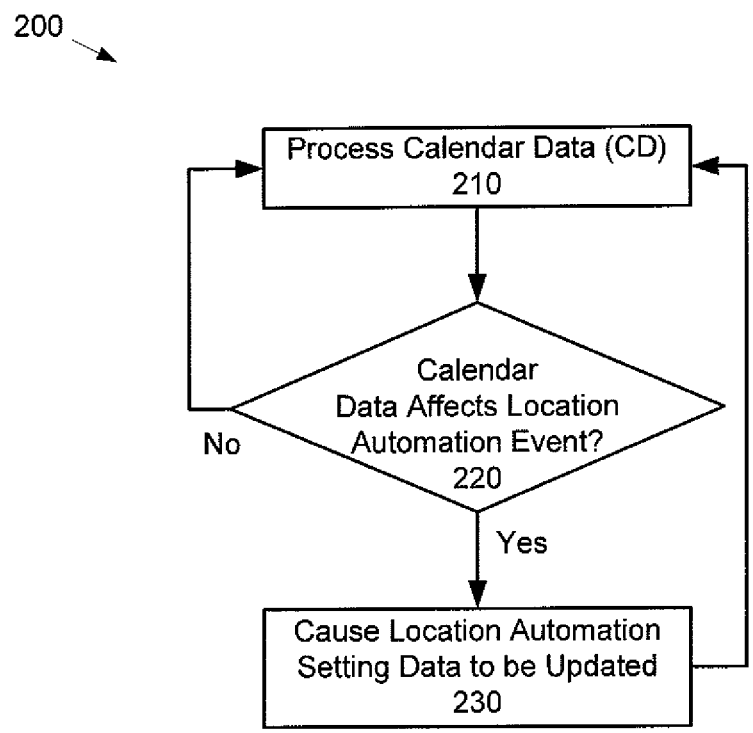
FIG. 2 depicts a flow chart of a method for controlling a location automation system, according to non-limiting embodiments.

Attention is now directed to FIG. 2 which depicts a method 200 for controlling a location automation system via computing device having access to a calendar database and in communication with location automation system. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present embodiments.

Steps 210, 220, and 230 can be repeated for different sets of calendar data 133 (whether on the same device or on several devices) associated with the location automation system 160. Repetition can mean processing sets of calendar data 133 in series (i.e., each set of data 133 is run through all the steps one at a time) or in parallel (i.e., each step is processed on all sets of data 133 before advancing to the next step).

At step 210, calendar data 133 is processed by processing unit 122, such that at step 220 it can be determined if at least one location automation event controlled by location automation system 160, is affected by calendar data 133. For example, processing unit 122 or 162 can compare calendar data 133 to at least one of location automation setting data 169, copy 169a, location automation rule data 185, and copy 185a to determine if at least one location automation event, controlled by location automation system 160, is affected by calendar data 133.

In some embodiments, steps 210 and 220 occur periodically, for example every hour, a few times per day, anytime a new entry occurs in the calendar, at a normal start time of a working day (e.g. 09:00), at a normal end time of a working day (e.g. 17:00) and the like, and/or a combination.

In other embodiments, steps 210 and 220 occur in response to a change to calendar data 133. For example, with reference to Table 2, when the meeting from 18:00 to 19:00 is scheduled, and calendar data 133 is updated to reflect the new meeting, steps 210 and 220 occur to determine if at least one location automation event 169 is affected by calendar data 133. In some of the these embodiments, such a change to calendar data 133 can trigger all of calendar data 133 to be processed or a portion of calendar data 133 to be processed. In some of these embodiments, only the changes to calendar data 133 are processed.

For example, steps 210 and 220 can comprise determining if changes have occurred to calendar data 133 and if the changes affect at least one location automation event controlled by location automation system 160.

In some embodiments, calendar data 133 can be retrieved from calendar database 132 via link 151, and compared to at least one of location automation setting data 169, copy 169a, location automation rule data 185 and/or copy 185a. For example, calendar data 133 from Table 2 can be compared to location automation setting data 169 in Table 1, by retrieving location automation setting data 169 via link 150 (or by retrieving copy 169a via link 151). From such a comparison it can be determined that the occupant of location 170 is busy at another location (e.g., work) until 19:00, and hence affecting events of turning on the heat at 17:30, and the lights and radio at 18:00 at location 170 (e.g., home). Alternatively, calendar data 133 can be compared to location automation settings 185 by retrieving location automation rule data 185 via link 150 (or by retrieving copy 185a via link 151), comprising the normal time that the occupant of location 170 arrives home from work (e.g. 18:00), and determines that the arrival time has now been shifted to 20:00 (assuming a travel time of 1 hour from work to home at location 170).

In alternative embodiments, step 220 can occur at location automation system 160. For example, computing device 110 can transmit a subset of calendar data 133 to location automation system 160 in a message 189, via link 150. Message 189 can comprise data representative of at least one change to calendar data 133, and/or calendar data 133 for a given time period (e.g. the 24 hours following a current time). Message 189 can be generated by processing unit 122 periodically and/or when changes occur to calendar data 133. Message 189 can be processed by processing unit 162 to compare data in message 189 to at least one of location automation setting data 169 and location automation rule data 185 to determine if at least one location automation event, controlled by location automation system 160, is affected by calendar data 133. In these embodiments, copy 169a and copy 185a need not be present in system 100. Rather computing device 110 is enabled to transmit message 189 and data relevant to updating location automation system settings 169 is stored at location automation system 160.

In any event, if at step 220 it is determined that at least one location automation event controlled by location automation system 160, is affected by calendar data, at step 230, location automation setting data 169, at location automation system 160, is caused to be updated, based on calendar data 133, such that at least one location automation event occurs according to calendar data 133. For example, processing unit 122 can be enabled to transmit a new arrival time (and/or or an end time of the meeting from 18:00 to 19:00) to location automation system 160, in a message 190 (as depicted in FIG. 1) which, upon receipt at location automation system 160 causes location automation system to update event data stored in location automation setting data 169 to reflect the new arrival time. For example, processing unit 162 can process message 190 and update location automation setting data 169 to the contents of Table 3, which is similar to Table 1:

TABLE 3

| Appliance/Device/ System | Event | Setting | Time |
|---|---|---|---|
| HVAC System | Set temperature to | 16° C. | 09:00 |
| HVAC System | Set temperature to | 22° C. | 19:30 |
| First Floor Lights | Turn off | OFF | 09:00 |
| First Floor Lights | Turn on | ON | 20:00 |
| Radio | Turn off | OFF | 09:00 |
| Radio | Turn on | ON | 20:00 |

Figure 3:
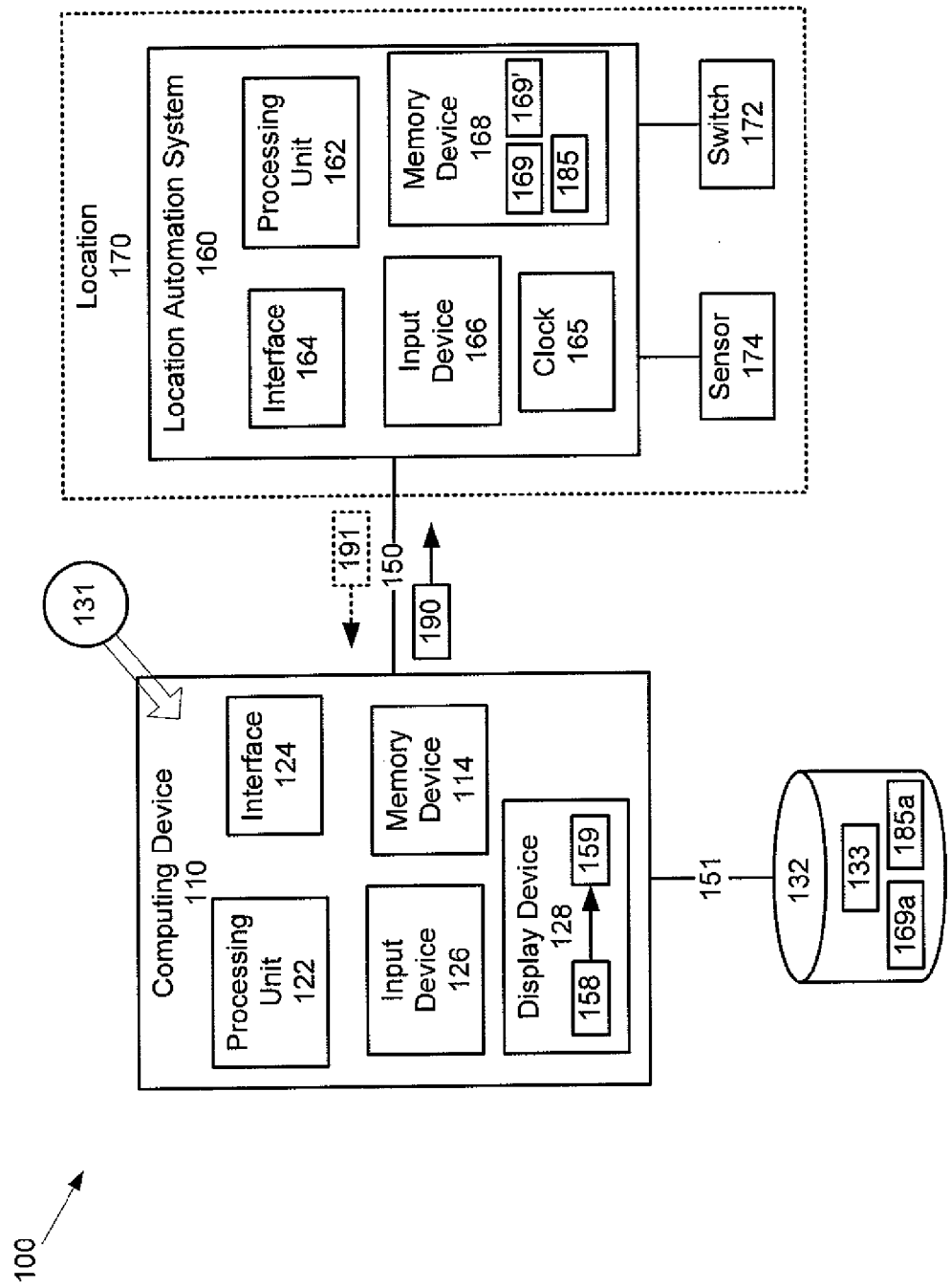
FIGS. 3 to 6 depict block diagrams of systems for controlling a location automation system, according to non-limiting embodiments.

Alternatively, as depicted in FIG. 3, a new set of location automation system data 169' can be generated by processing unit 162 and stored in memory 168, for later processing by processing unit 162 to control location 170 via at least one switch 172 (and optionally at least one sensor 174). For example, the new set of location automation system data 169' can be generated which comprises the contents of Table 3, without changing location automation system data 169. It is understood that the new set of location automation system data 169' is processed on the date that the new arrival time is to occur, after which location automation system 160 reverts back to the location automation settings 169.

In some embodiments, rather than directly transmit message 190 to location automation system 160, processing unit 122 causes copy 169a of a location automation settings 169 to be updated to reflect changes to calendar data 133, and further causes a synchronization to be performed between calendar database 132 and location automation system 160, such that location automation settings 169 are updated with, for example, the contents of Table 3. In other embodiments, copy 169a is synchronized with location automation settings 169 on a periodic basis, and/or when a change occurs to at least one of location automation systems settings 169 and copy 169a. It is, however, understood that default settings for location automation system 160 are to be unaffected and the synchronization occurs only to affect event data directly affected by calendar data 133, such as changes to calendar data 133.

In yet further embodiments, location automation system 160 can be enabled to request changes to location automation system data 169, via a request 191, as depicted in FIG. 3. In these embodiments, receipt of request 191 at computing device 110 can trigger transmission of message 190. In yet further embodiments, receipt of request 191 at computing device 110 can trigger steps 210 and 220 to generate message 190. In some of these embodiments, location automation system 160 can be enabled to transmit request 191 to location automation system data 169 on a periodic basis and/or as desired.

In yet further embodiments, when the comparison of step 220 occurs at location automation system 160, the changes to location automation system data 169 occur via processing unit 162. Copy 169a, if present, can be updated either by transmitting a command to update copy 169a to computing device 110 and/or via a periodic synchronization.

In any event, causing location automation setting data 169 to be updated at step 230 can comprise at least one of: synchronizing calendar database 132 and location automation system 160; synchronising copy of location automation system data 169a and location automation system data 169, notifying location automation system 160 of changes to location automation system data 169, for example via message 190; and receiving request 191 from location automation system 160 for changes to location automation system data 169.

Returning to step 220. In the event that it is determined that calendar data 133 does not affect at least one location automation event, step 210 can be repeated as desired.

Figure 4:
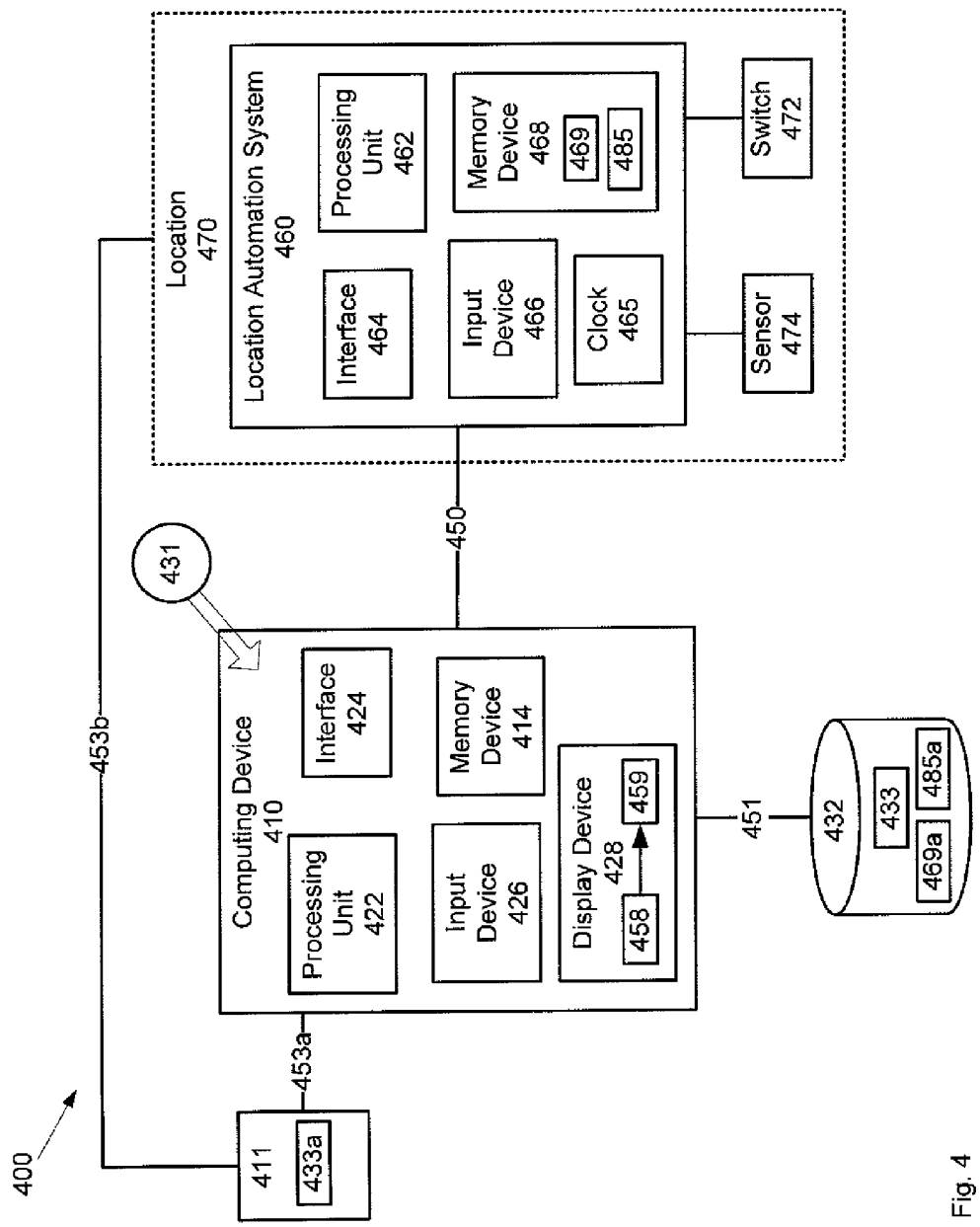

Attention is now to FIG. 4, which is similar to FIG. 1, with like elements having like numbers, however preceded by a "4" rather than a "1". For example system 400 is similar to system 100, except where described below, and location automation system 460 is similar to location automation system 160. In particular, system 400 includes memory device 414, processing unit 422, communications interface 424, input device 426, application 431, database 432, link 450, link 451, circuitry 458, representation 459, communications interface 464, processing unit 462, input device 466, clock 465, memory device 468, location automation rule data 485, and a copy 485a of location automation rule data. However, system 400 further comprises a second computing device 411, which comprises calendar data 433a, and which is enabled for communication with computing device 410 via link 453a, which can be wired or wireless as desired, similar to link 150 described above. In these embodiments, while not depicted, it is understood that computing device 411 can comprise any suitable combination of processing units, communication interfaces, memory device, input device, display devices, etc. Furthermore, it is understood that computing device 411 is associated with an occupant of location 470. It is furthermore understood that calendar data 433a comprises a schedule of the occupant of location 470, and that calendar data 433a can be synchronized with calendar data 433, via communication with computing device 410. It is further understood that calendar data 433a can be stored in a calendar database (not depicted) associated with computing device 411. It is yet further understood that while calendar data 433a is depicted as being stored at computing devices 411, in other embodiments, calendar data 433a can be stored at another computing device accessible to computing device 411.

In some of these embodiments, computing device 411 can comprise at least one of a personal computer, a laptop, a PDA, a smartphone, a cellphone and the like. In some embodiments, computing device 411 can be similar and/or identical to computing device 410. In any event, computing device 411 can comprise any computing device that can be synchronized with computing device 410, including but not limited to calendar database 432. Similarly, computing device 410 can be a web server, which is enabled to maintain calendar data 433 as a network accessible calendar. Hence, during synchronization, calendar data 433a is synchronized with calendar data 433, such that the schedule of the occupant of location 430 is available via the network accessible calendar.

In some embodiments, computing devices 410, 411 can each be associated with an occupant of location 470. For example, computing device 410 can comprise the occupant's work computer while computing device 411 can comprise the occupants PDA.

Thus, in some embodiments, if changes occur to calendar data 433a, after synchronization, similar changes are made to calendar data 433. It is understood that a provisioning synchronization can first occur between calendar data 433a and calendar data 433. In any event, method 200 can be implemented in system 400 to process calendar data 433 at computing device 410 to determine that at least one location automation event controlled by location automation system 460, is affected by calendar data 433. In response, computing device 410 causes location automation setting data 469, at location automation system 460, to be updated, based on calendar data 433 such that at least one location automation event occurs according to calendar data 433, as described above. Hence, if computing device 411 is associated with a business based entity (i.e. computing device 411 is the work computer of an occupant of location 470), then method 200 can be implemented in a web-based environment, presuming synchronization between computing device 411 and computing device 410.

Figure 6:
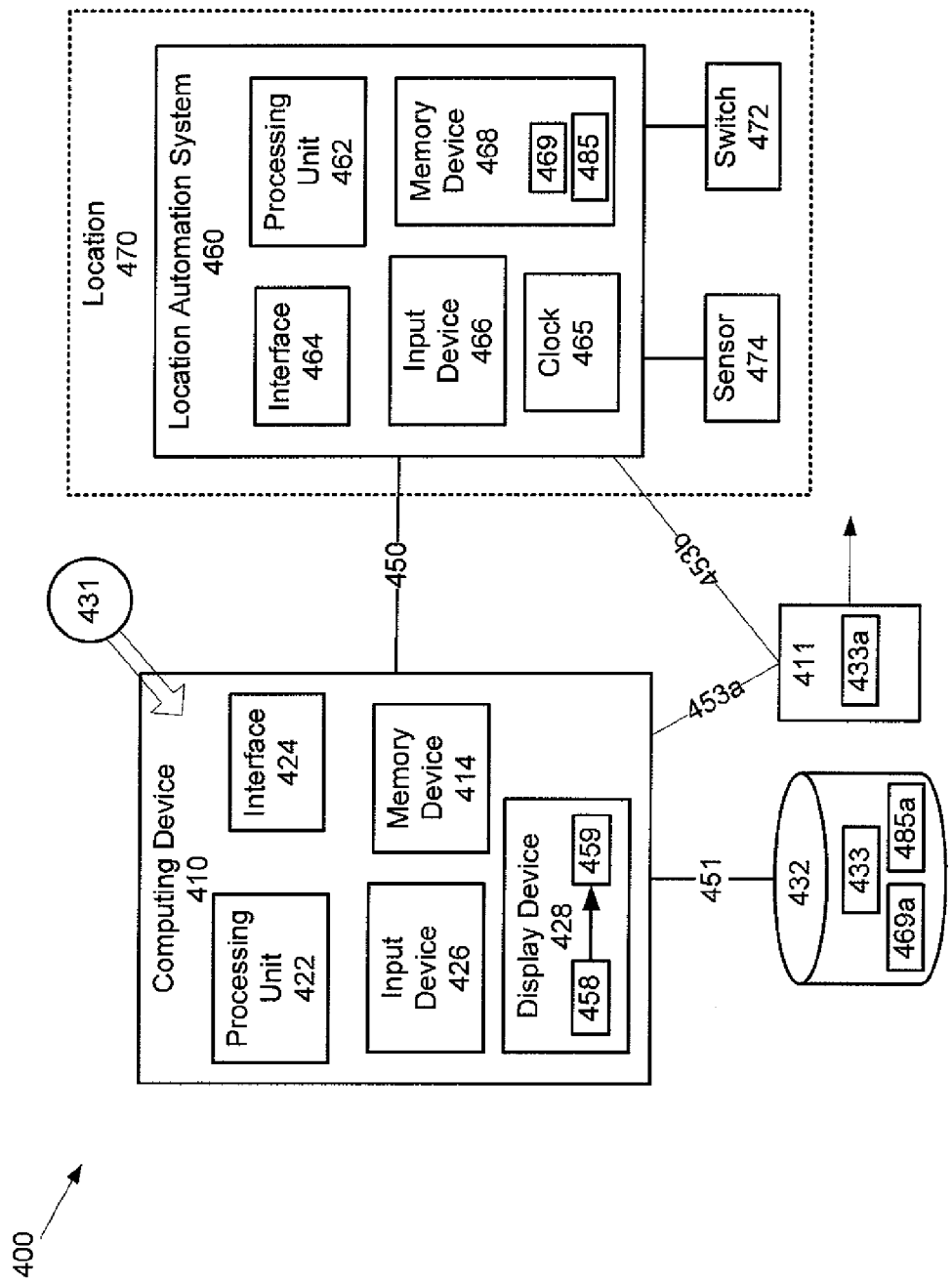

In some of these embodiments, for example where computing device 411 comprises a portable computing device, method 200 can further comprise determining proximity of a computing device 411 to location 470 and causing location automation setting data 469 to be updated based on proximity. For example, attention is directed to FIG. 6, which is substantially similar to FIG. 4 with like elements having like numbers. In FIG. 6, it is understood that computing device 411 is moving, but is in communication with at least one of computing device 410 and location 470 via link 453a and/or a link 453b (similar to link 453a, however between computing device 411 and location automation system 470). In these embodiments, the position of computing device 411 can be determined by any suitable method, including but not limited to a global positioning system (GPS), a cell-tower triangulation of computing device 411, and the like, such that the proximity of computing device 411 can be determined. In some of these embodiments, it is understood that computing device 411 comprises a GPS unit.

In any event, if location automation event data 469 has been updated to comprise the contents of Table 3, based on calendar data 433a similar to the contents of Table 2, but the meeting from 18:00 to 19:00 either ends early or is cancelled, location automation event data 469 can be updated based on proximity, for example when calendar data 433a is not updated to reflect the early end time/cancellation. Similarly, when calendar data 433a is not updated when an occupant of location 470, associated with computing device 411, leaves work early, for example due to illness, location automation event data 469 can be updated based on proximity.

Figure 7:
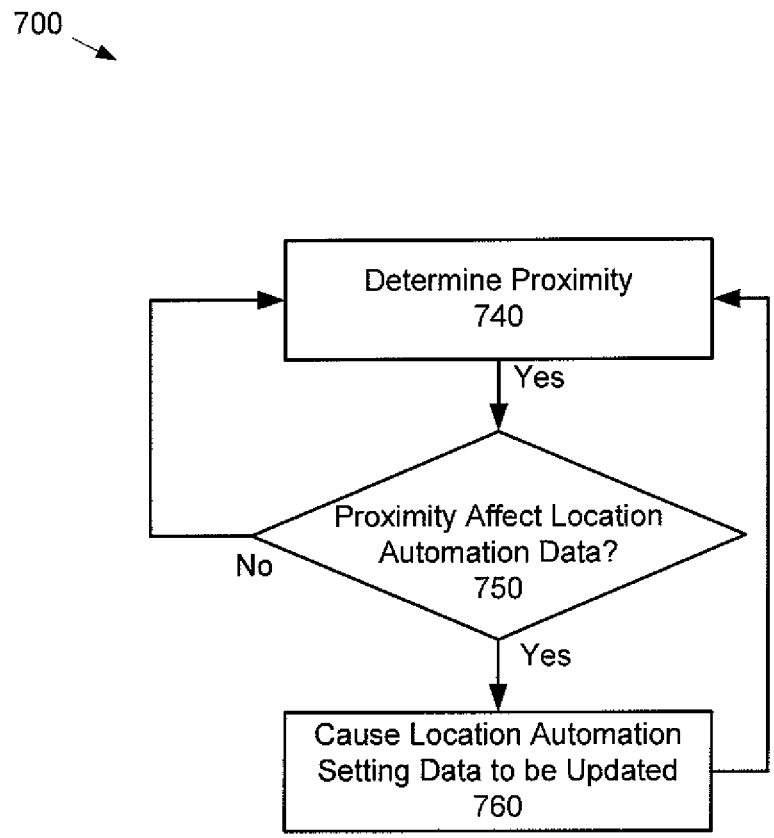
FIG. 7 depicts a flow chart of a method for controlling a location automation system, according to non-limiting embodiments.

For example, FIG. 7 depicts a method 700 for controlling a location automation system via computing device having access to a calendar database and in communication with location automation system. In order to assist in the explanation of method 700, it will be assumed that method 700 is performed using system 400 as depicted in FIG. 6. Furthermore, the following discussion of method 700 will lead to a further understanding of system 400 and its various components. However, it is to be understood that system 400 and/or method 700 can be varied, and need not work exactly as discussed herein in conjunction with each other, and that such variations are within the scope of present embodiments. Furthermore, it is understood that method 700 can operate in parallel to method 200. In addition, as with the method 200, if there are multiple devices 411, then the steps of the method 700 can act on the devices 411 in series or in parallel.

At step 740, the proximity of computing device 411 to location 470 is determined, for example based on a location of computing device 411 detected via GPS and/or cell-tower triangulation and/or any other suitable method. At step 750 it is determined if proximity affects location automation data 469. For example, if proximity is above a given value (e.g. the distance between location 470 and an office), then step 750 can be repeated. However, if proximity is below a given value and/or if a change in proximity is detected which indicates that computing device 411 is moving towards location 470, then it can be determined if proximity affects location automation data 469. For example, if location automation data 469 is based on an arrival time at location 470 being 20:00, as in Table 3, and it is determined at step 750, at a time of 18:30, that computing device 411 is within a given distance from location 470, than location automation data 469 can be updated at step 760 based on proximity and, in some embodiments, a speed at which computing device 411 is moving towards location 470. In other words, location automation data 469 is updated to reflect a new arrival time of an occupant at location 470. Step 740 can then be repeated.

Figure 5:
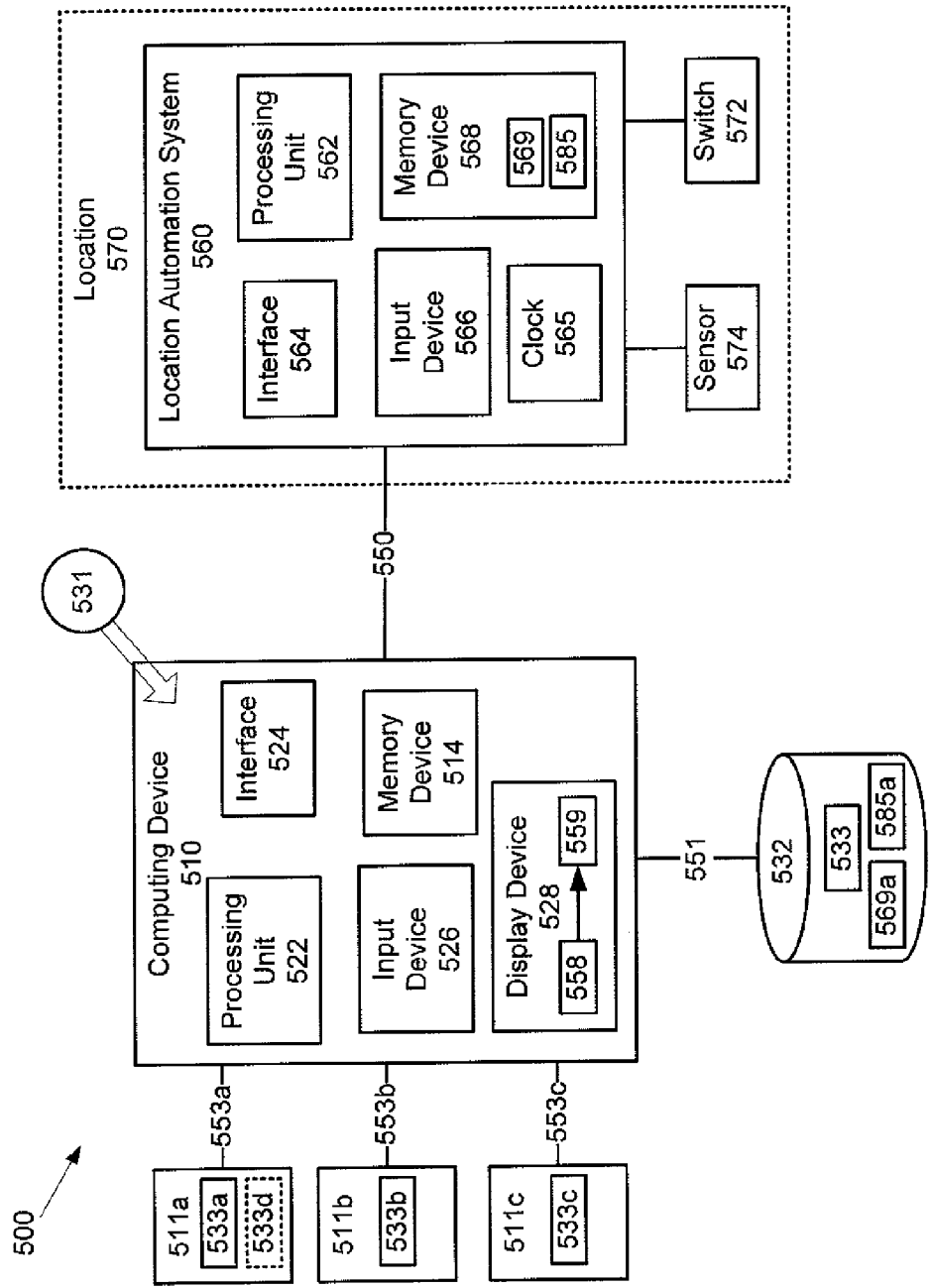

Attention is now to FIG. 5, which is similar to FIG. 4, with like elements having like numbers, however preceded by a "5" rather than a "4". For example system 500 is similar to system 400, except where described below, and location automation system 560 is similar to location automation system 460. In particular, system 500 includes memory device 514, processing unit 522, communications interface 524, input device 526, display device 528, application 531, link 551, circuitry 558, representation 559, processing unit 562, clock 565, and input device 566. However, system 500 further comprises a plurality of computing devices 511a, 511b, 511c, each of which comprises respective calendar data 533a, 533b, and 533c, and each of which are enabled for communication with computing device 510 via respective links 553a, 553b, 553c, which can be wired or wireless as desired, similar to link 150 described above. While only three computing devices 511a, 511b, 511c are depicted in FIG. 5, it is understood that system 500 can comprise any suitable number of computing devices.

In some embodiments, as will be described in further detail below, computing device 510 can be assigned a priority higher than computing devices 511, such that computing device 510 comprises a master device and computing devices 511 are subordinate to it. For example, each computing device 510, 511 can be associated with an occupant of location 570, but computing device 510 can be associated with an occupant of location of 570 who has priority and/or authority (e.g. a landlord, a manager, a parent etc.) over the other occupants of location 570.

In any event, it is understood that each of computing devices 511a, 511b, 511c can comprise any suitable combination of processing units, communication interfaces, memory device, input device, display devices, etc. Furthermore, it is understood that each of computing devices 511a, 511b, 511c are associated with an occupant of location 570, for example, members of a family living at location 570 or members of an office working at location 570. It is furthermore understood that each respective calendar data 533a, 533b, and 533c comprises a schedule of each occupant of location 570, and that calendar data 533a, 533b, and 533c can be synchronized with calendar data 533, via communication with computing device 510, such that calendar data 533 represents a shared calendar. In some embodiments, such synchronization can be a one-way synchronization such that calendar data 533 comprises calendar data 533a, 533b, and 533c, but respective calendar data 533a, 533b, and 533c do not comprise each other. It is further understood that each of calendar data 533a, 533b, and 533c can be stored in a calendar database (not depicted) associated with each of computing device 511a, 511b, and 511c. It is yet further understood that while each of calendar data 533a, 533b, and 533c is depicted as being stored at respective computing devices 511a, 511b, and 511c, in other embodiments, calendar data 533a, 533b, and 533c can be stored at another computing device each accessible to respective computing devices 511a, 511b, and 511c.

It is furthermore understood that calendar data 533a, 533b, and 533c comprises a respective schedule of the occupant of location 470, and that each of calendar data 533a, 533b, and 533c can be synchronized with calendar data 533, via communication with computing device 510 on different or similar synchronization schedules. For example, each of computing devices 511a, 511b, and 511c can comprise at least one of a personal computer, a laptop, a PDA, a smartphone, a cellphone and the like, which can be synchronized with computing device 510, including but not limited to calendar database 532. Similarly, computing device 510 can be a web server, which is enabled to maintain calendar data 533 as an internet accessible calendar. Hence, during synchronization with each of computing devices 511a, 511b, and 511c, calendar data 533a, 533b, and 533c is synchronized with calendar data 533, such that the schedule of the occupant of location 570 is available via the internet accessible calendar. Hence, in some embodiments, calendar data 533 can comprise a shared web-calendar which stores the schedules of a family living at location 170. However, in other embodiments, calendar data 533 can comprise a business group calendar for, e.g. an office.

In some embodiments, such synchronization can be a one-way synchronization such that calendar data 533 comprises calendar data 533a, 533b, and 533c, but respective calendar data 533a, 533b, and 533c do not comprise each other.

In yet further embodiments, each individual calendar data 533a, 533b, 533c can be "monitored" by location automation system 560 and/or computing device 410, and causing location automation setting data 568 to be updated occurs when one or more calendar data 533a, 533b, 533c changes.

Method 200 can be implemented in system 500, however in these embodiments, method 200 further comprises synchronizing calendar database 532 with plurality of calendar databases represented by calendar data 533a, 533b, 533c, such that calendar data 533 comprises calendar data 533a, 533b, 533c from the plurality of calendar databases. Furthermore, it is understood that in these embodiments, step 230 for causing location automation setting data 569, at location automation system 560, to be updated is based on calendar data 533a, 533b, 533c associated with a respective one of a plurality of calendar databases.

Furthermore, causing location automation setting data 569 to be updated can be based on a priority of each of the plurality of calendar databases and/or the updating can be coordinated based on changes to each of calendar data 533a, 533b, 533c. For example, if calendar data 533a indicates that a first occupant of location 570 is busy until 19.00 while calendar data 533b indicates a second occupant of location 570 is busy until 17:00 (i.e. normal time for leaving work, plus a time for travelling from work to location 570), no changes can be made to location automation setting data 569 (i.e. heating is still turned on at 17:30, and lights/radio etc. are turned on at 18:00 as in Table 1).

However if calendar data 533a and 533b both indicate that first and second occupants of location 570 are busy until 19:00, then location automation setting data 569 is updated as in Table 3, such that turning on of the heat/light/radio is delayed.

Furthermore, it is understood that one of calendar data 533a, 533b, 533c can be given priority, for example if an occupant of location 570 associated with calendar data 533a is a landlord of location 570 and occupants of location 570 associated with calendar data 533b and 533c are tenants of location 570. In these embodiments, the occupant of location 570 associated with calendar data 533a may prefer that location automation setting data 569 be synchronized to their calendar data 533a only unless certain conditions apply, such as occupant of location 570 associated with calendar data 533a going on vacation or a business trip. In these embodiments, another of calendar data 533b, 533c can be given priority and/or updating of location automation setting data 569 can be updated based on coordinating calendar data 533b, 533c, as described above.

Such embodiments enable different scenarios at location 570, including scenarios involving security. For example, communication devices 511a, 511b can be associated with parental occupants of location 570 while communication device 511c can be associated with a child occupant of location 570 (i.e. communication devices 511 are each associated with members of a family that occupy location 570). Hence, if communication device 511c arrives at location 570 earlier than usually expected (according to calendar data 533c), e.g. a child arrives home early, the proximity of communication device 511c to location 570 triggers location automation system 560 to switch on the lights and heating system when they are proximal to location 570 (i.e. come home). A communication device 511 that is designated as a master communication device (i.e. a communication device 511 that has been given priority), and is associated with a parent associated, can be notified that a change to location automation setting data 569 has occurred and/or if location automation system 560 has caused switch 572 to be activated (or any other suitable switch) and/or if an unexpected change to location 570 is recorded at sensor 574. That such a notification is to occur can be saved in location automation rule data 585 and/or copy 585a. Hence the parent is notified that the child has returned home. Such a notification could trigger a security concern for the parent: for example the child can be a young child and wouldn't be one to come home on their own. Hence, a parent might wonder if it was the child or someone that had stolen communication device 511c and has entered location 570.

Other security aspects can be associated with system 500 (and/or system 100 and/or system 400). For example, computing device 510 and/or computing device 110 and/or computing device 410 can be notified each time a change occurs to location automation setting data 169, 469, 569 and/or copy 169a, 469a, 569a, and/or if location automation system 160, 460, 560 has caused switch 172, 472, 572 to be activated (or any other suitable switch) and/or if an unexpected change to location 170, 470, 570 is recorded at sensor 174, 474, 574.

In some embodiments, a computing device 511, for example computing device 511a, can be associated with more than one occupant of location 170, and hence more than one set of calendar data, for example similar to calendar data 533a and calendar data 533d. Calendar data 533d is synchronized with calendar data 533 as described above with reference to calendar data 533a, 533b, 533. In these embodiments, computing device 511a can be logged into using a log-in process such that it is understood which of calendar data 533a, 533d is to be updated, and further which of calendar data 533a, 533d is to be used to update location automation setting data 569. Furthermore, in embodiments where location automation setting data 569 is further updated based on proximity and/or based on priority, as described above, the update can be performed based on which occupant of location 170 is currently logged into computing device 511a. In yet further embodiments, the calendar data 533a, 533b, 533c which is assigned priority can change based on the time of day, location of an associated device 511, who is logged into an associated computing device 511. Such rules can be saved in location automation rule data 585 and/or copy 585a.

In yet further embodiments, more than one computing device 511 can be associated with a single occupant of location 170. For example computing device 511a can comprise a mobile phone for the office and computing device 511b can comprise a mobile phone for the home. An occupant of location 170 can switch between computing device 511a, 511b depending on time of day and/or when calls are received or made at each of computing devices 511a, 511b and/or when calendar data 533a, 533b is updated on each of computing devices 511a, 511b, and/or at any other suitable time. In any event, in embodiments where location automation setting data 569 is further updated based on proximity and/or based on priority, location automation setting data 569 can be further based on proximity of one and/or both of computing devices 511a, 511b to location 570. Such rules can be saved in location automation rule data 585 and/or copy 585a. For example, a rule can be set such that an HVAC system is controlled at location 570 when one or both of computing devices 511a, 511b are proximate to, and/or located at, location 570 (i.e. the occupant associated with location 570 and each of computing devices 511a, 511b is home and/or coming home). Alternatively, a rule can be set such that an HVAC system is controlled at location 570 when both of computing devices 511a, 511b have been located at location 570, and one of computing device 511 and computing device 511b is then removed from location 570. For example, it can be assumed that if both computing devices 511a, 511b were located at location 570, and one is removed, then the associated occupant has gone out. In some of these embodiments, such control/rules can be further based on the time of day (e.g. an occupant returns home from work after 5.00 p and then goes out for the evening).

Figure 8:
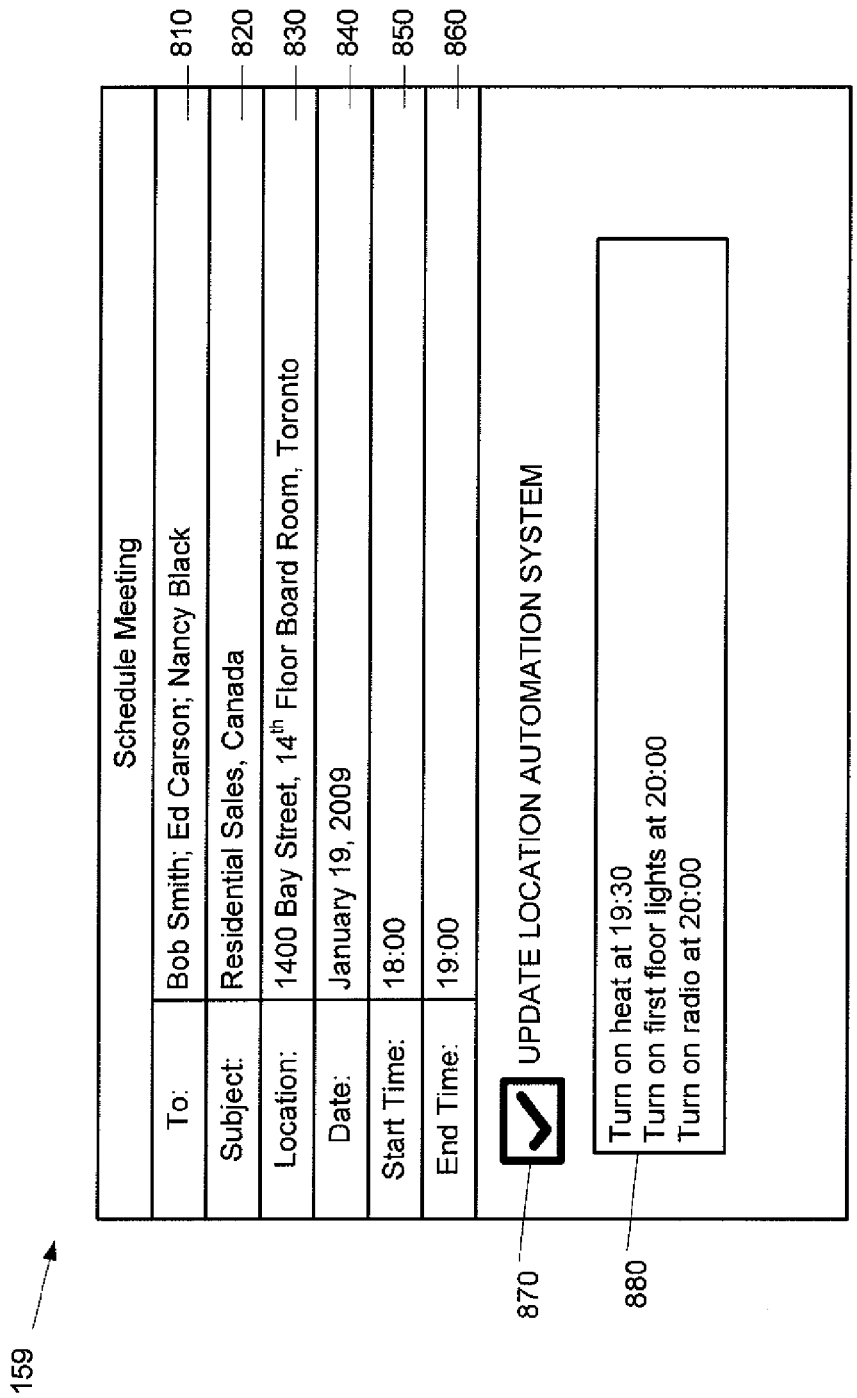
FIG. 8 depicts a schematic diagram of a representation of data for scheduling a meeting, according to non-limiting embodiments.

Attention is now directed to FIG. 8, which depicts a schematic of non-limiting embodiments of representation 159 for scheduling a meeting, comprising a view of a calendar application a meeting is scheduled. In this embodiment, invitees can be selected and/or entered via an optional "To" field 810, subject data for the meeting can be selected and/or entered via a "Subject" field 820, location data for the meeting can be selected and/or entered via a "Location" field 830, a date, start and end times for the meeting can be selected and/or entered via respective "Date", "Start Time" and "End Time" fields 840, 850, 860. Furthermore, in these embodiments, representation 159 comprises a checkbox 870 which, when activated (as depicted), indicates that an "Update Location Automation System" option has been selected, such that location automation setting data 169 (and/or 469 and/or 569) is to be updated based on data received via representation 159, which can be used to update calendar data 133 (and/or 433 and/or 533). In some embodiments, if checkbox 870 is activated, location automation setting data 169 (and/or 469 and/or 569) can be updated based on data received via representation 159; if checkbox is not activated, location automation setting data 169 (and/or 469 and/or 569) is not updated. Alternatively, in some embodiments, if checkbox is activated, location automation setting data 169 can be updated based on further data received in a field 880. When data received via representation 159 is stored in calendar data 133 (and/or 433 and/or 533), data received in field 880 can also be stored in calendar data 133; location automation setting data 169 (and/or 469 and/or 569) can then be updated based on data received in field 880 and stored in calendar data 133. Alternatively, when checkbox 870 is activated, message 190 is transmitted to location automation system 160 (and/or 460) with information 880 such that location automation system 160 is updated.

In any event, by processing calendar data to determine that at least one location automation event controlled by a location automation system, is affected by a calendar data, and causing location automation setting data, at the location automation system, to be updated, based on the calendar data such that at least one location automation event occurs according to calendar data, significant energy savings can be found by ensuring that electrical appliances, HVAC systems etc. at a location controlled by the location automation system are not operated for longer than necessary. Furthermore, if there is a plurality of occupants at the location, bandwidth is saved by reducing between communications between them to coordinate remote control of the location automation system.

Those skilled in the art will appreciate that in some embodiments, the functionality of computing devices 110, 410, 411, 510, 511a, 511b, 511c, location automation system 160, 460, 560 and calendar database 132, 432, 532 can be implemented using pre-programmed hardware or firmware elements (e.g., application specific integrated circuits (ASICs), electrically erasable programmable read-only memories (EEPROMs), etc.), or other related components. In other embodiments, the functionality of computing devices 110, 410, 411, 510, 511a, 511b, 511c, location automation system 160, 460, 560 and calendar database 132, 432, 532 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for controlling a location automation system via a computing device having access to a first calendar system, the method comprising:
   processing first calendar data, from the first calendar system, to determine that at least one location automation event included in a second calendar system controlled by the location automation system is related to the first calendar data, the first calendar system stored at a memory of the computing device, the computing device being distinct and different from the location automation system, the first calendar system inaccessible by and distinct from the location automation system data, the first calendar system being distinct and different from the second calendar system;
   determining that changes have occurred to the first calendar data;
   determining whether the at least one location automation event related to the first calendar data is affected by the changes to the first calendar data;
   in response to the determination that the at least one location automation event included in the second calendar system is affected by the changes to the first calendar data, causing location automation setting data, at the location automation system, to be updated based on the changes to the first calendar data such that the at least one location automation event included in the second calendar system is rescheduled according to the changes to the first calendar data of the first calendar system that is stored at the memory of the computing device.

2. The method of claim 1, wherein the processing the first calendar data occurs in response to a change to the first calendar data.

3. The method of claim 1, wherein the processing the first calendar data comprises comparing at least a subset of the first calendar data to at least one of the location automation setting data and location automation rule data to determine if the at least one location automation event controlled by the location automation system, is affected by the first calendar data.

4. The method of claim 3, wherein the location automation rule data comprises at least one rule for changing a setting in the location automation system.

5. The method of claim 1, wherein causing location automation setting data to be updated comprises at least one of: notifying the location automation system of changes to the location automation system data; receiving a request from the location automation system for the changes to the location automation system data; and processing the location automation setting data to store the changes to the location automation system data.

6. The method of claim 1, further comprising synchronizing the first calendar data with a plurality of calendar data such that the first calendar data comprises calendar data from the plurality of calendar data.

7. The method of claim 6, wherein the causing the location automation setting data location to be updated is based on at least one of: calendar data associated with a respective one of the plurality of calendar data; and a priority of each of the plurality of calendar data.

8. The method of claim 1, further comprising determining proximity of a device to a location controlled by the location automation system and causing the location automation setting data, at the location automation system, to be updated based on the proximity.

9. The method of claim 1, wherein a plurality of devices are associated with the location automation system, such that the location automation setting data is updated based on at least one respective calendar system.

10. The method of claim 9, wherein one of the plurality of devices is designated as a master device having priority over others of the plurality of devices, such that the location automation setting data is updated first based on at least one of calendar data associated with and proximity of the master device to the location.

11. The method of claim 1, wherein the computing device comprises a shared device associated with a plurality of calendar data, such that the location automation setting data is updated based on the plurality of calendar data.

12. The method of claim 1, wherein the first calendar data comprises at least one of a date of a meeting, a start time of a meeting, an end time of a meeting, a subject of a meeting, a location of a meeting, a category of a meeting, a recurrence indication, and invitees to a meeting.

13. A computing device for controlling a location automation system via a first calendar system, comprising:
a processing unit interconnected with a memory and a communications interface, the memory storing the first calendar system, the first calendar system being inaccessible by and distinct from the location automation system, the location automation system being distinct and different from the computing device, the processing unit configured to:
process first calendar data, from the first calendar system stored by the memory, to determine that at least one location automation event included in a second calendar system controlled by the location automation system, is related to the first calendar data, the first calendar system being distinct and different from the second calendar system;
determine that changes have occurred to the first calendar data;
determine whether the at least one location automation event related to the first calendar data is affected by the changes to the first calendar data;
in response to the determination that the at least one location automation event included in the second calendar system is affected by the changes to the first calendar data, cause the location automation setting data, at the location automation system, to be updated, based on the changes to the first calendar data such that the at least one location automation event included in the second calendar system is rescheduled according to the changes to the first calendar data of the first calendar system that is stored by the memory.

14. The computing device of claim 13, wherein the processing unit is further enabled to process the first calendar data in response to a change to the first calendar data.

15. The computing device of claim 13, wherein to process the first calendar data, the processing unit is further enabled to compare at least a subset of the first calendar data to at least one of the location automation setting data and location automation rule data to determine if the at least one location automation event controlled by the location automation system, is affected by the first calendar data.

16. The computing device of claim 15, wherein the location automation rule data comprises at least one rule for changing a setting in the location automation system.

17. The computing device of claim 13, wherein to cause location automation setting data to be updated, the processing unit is further enabled to at least one of: notify the location automation system of changes to the location automation system data; receive a request from the location automation system for the changes to the location automation system data; and process the location automation setting data to store the changes to the location automation system data.

18. The computing device of claim 13, wherein the processing unit is further enabled to synchronize the first calendar data with a plurality of calendar data such that the first calendar data comprises calendar data from the plurality of calendar data.

19. The computing device of claim 18, wherein the processing unit is further enabled to cause the location automation setting data, at the location automation system, to be updated based on at least one of: calendar data associated with a respective one of the plurality of calendar data; and a priority of each of the plurality of calendar data.

20. The computing device of claim 13, wherein the processing unit is further enabled to determine proximity of a device to a location controlled by the location automation system and cause the location automation setting data, at the location automation system, to be updated based on the proximity.

21. The computing device of claim 13, wherein a plurality of devices are associated with the location automation system, such that the location automation setting data is updated based on at least one respective calendar data.

22. The computing device of claim 21, wherein one of the plurality of devices is designated as a master device having priority over others of the plurality of devices, such that the location automation setting data is updated first based on at least one of calendar data associated with and proximity of the master device to the location.

23. The computing device of claim 13, wherein the computing device further comprises a shared device associated with a plurality of calendar data, such that the location automation setting data is updated based on the plurality of calendar data.

24. The computing device of claim 13, wherein the first calendar data comprises at least one of a date of a meeting, a start time of a meeting, an end time of a meeting, a subject of a meeting, a location of a meeting, a category of a meeting, a recurrence indication, and invitees to a meeting.

25. The computing apparatus of claim 13, wherein the computing apparatus is located at one of the location automation system and a location remote from the location automation system.

26. A computer program product, comprising a non-transitory computer usable medium having a computer readable program code adapted to be executed to implement a method for controlling a location automation system via computing device having access to a first calendar system, comprising:

processing first calendar data, from the first calendar system, to determine that at least one location automation event included in a second calendar system controlled by the location automation system, is related to the first calendar data, the first calendar system stored at a memory of the computing device, the computing device being distinct and different from the location automation system, the first calendar system inaccessible and distinct from the location automation system data, the first calendar system being distinct and different from the second calendar system;

determining that changes have occurred to the first calendar data;

determining whether the at least one location automation event related to the first calendar data is affected by the changes to the first calendar data;

in response to the determination that the at least one location automation event included in a second calendar system is affected by the changes to the first calendar data, causing location automation setting data, at the location automation system, to be updated, based on the changes to the first calendar data such that the at least one location automation event included in the second calendar system is rescheduled according to the changes to the first calendar data of the first calendar system that is stored at the memory of the computing device.

* * * * *